Jan. 28, 1964 J. R. MARINE 3,119,421
LAND CLEARING IMPLEMENT
Filed Feb. 4, 1963 2 Sheets-Sheet 2

INVENTOR.
John R. Marine
BY Jennings, Carter & Thompson

3,119,421
LAND CLEARING IMPLEMENT
John R. Marine, Panola, Ala.
Filed Feb. 4, 1963, Ser. No. 256,067
6 Claims. (Cl. 144—34)

This invention relates to a land clearing implement and more particularly to such an implement which shall be adapted to clear the entire area over which the implement passes by a substantially continuous forward movement of the clearing implement.

An object of my invention is to provide a land clearing implement which shall be adapted to clear land of all types of vegetation, including trees of various sizes.

Another object of my invention is to provide a land clearing implement of the character designated which shall include a shear blade which extends forwardly and inwardly of the implement in a generally horizontal plane from one side of the implement across the center line thereof, together with a splitter element adjacent the inner end of the blade whereby a lateral blade thrust is provided to counterbalance the force exerted against the splitter element as it engages obstacles, such as trees and the like.

Another object of my invention is to provide land clearing apparatus of the character designated which shall be adapted to shear off large stumps, trees and the like by making successive passes at the stump adjacent the ground level thereof whereby the stump is completely removed.

A further object of my invention is to provide a land clearing implement of the character designated in which small vegetation may be removed at the same time large stumps, trees and the like are removed, thereby eliminating the necessity of having to first remove small vegetation and then later remove the larger tree trunks and the like.

A still further object of my invention is to provide land clearing apparatus of the character designated which shall be simple of construction, economical of manufacture and which may be adapted for use on conventional type tractors with the working portion of the implement in easy view of the operator.

Heretofore in the art to which my invention relates, land clearing implements of various types have been proposed. Such implements usually comprise a pair of outwardly and rearwardly extending blades having a splitter mounted at the center line of the implement and at the forward ends of the blades. With such apparatus the operator cannot see the splitter as it moves into engagement with a tree trunk or the like. Accordingly, the blade is not guided accurately into engagement with the obstacle but is merely guided by guesswork. Also, with land clearing implements having shear blades connected at opposite sides of a splitting element there is no effective splitting off and cutting of a tree trunk due to the fact that upon engagement of the splitter element with the tree trunk, the laterally extending blades wedge into the trunk to thereby stall the apparatus. On the other hand, if it is attempted to strike the tree trunk at a side thereof, the entire implement and the tractor is forced around whereby the tractor loses its power or ability to move forward. Furthermore, with conventional type land clearing apparatus, it is necessary to first cut the small vegetation or growth and then rake the same prior to cutting the larger growth. After the larger growth is cut it is then raked, thereby requiring four separate steps in the clearing of an area of land.

To overcome the above and other difficulties, I provide land clearing apparatus in which the larger growth is removed along with the smaller growth, thereby greatly reducing the time and labor required to clear an area. With my improved apparatus, the splitter element is mounted at the forward end of an inwardly and forwardly extending shear blade which extends from one side of the implement across the center line thereof. A second shear blade is mounted at the opposite side of the implement and extends inwardly and forwardly to terminate at a point rearwardly of the inner end of the shear blade which extends across the center line of the implement. Accordingly, the splitter element and the forward portion of the shear blade which extends across the center line of the implement splits and shears off a portion of an object before the other shear blade contacts the object.

Apparatus embodying features of my invention is illustrated in the accompanying drawings, forming a part of this application, in which:

FIG. 4 is a fragmental, plan view showing the manner in which the splitter element and the shear blade mounted adjacent thereto splits off and shears a portion of a large tree trunk or the like.

Figure 2:
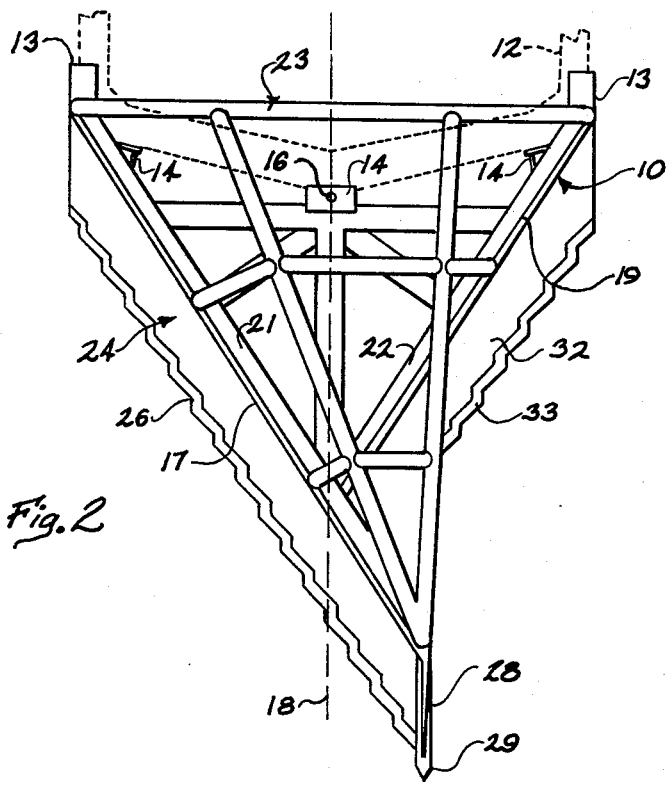
FIG. 2 is a top plan view of the implement, drawn to a smaller scale, and showing in dotted lines the C-frame which connects the implement to a power unit such as a tractor.

Referring now to the drawings for a better understanding of my invention, I show my implement frame generally at 10 which is connected to a tractor indicated at 11 by a C-frame 12. The C-frame 12 is connected to the rear portion of the implement frame by any suitable means, such as by providing rearwardly extending channel-like portions 13 which receive side portions of the C-frame while suitable brace members 14 are provided intermediate the channel-shaped members in position to engage the forward side of the C-frame 12, as shown in FIG. 2. The central portion of the C-frame 12 may be connected to the center brace member 14 by a suitable pin 16.

The implement frame 10 is provided with a first vertical side plate 17 which extends inwardly and forwardly across the center line of the frame whereby the forward end thereof is spaced laterally from a plane passing through the longitudinal center of the implement frame 10, indicated by the dotted line 18. Mounted at the opposite side of the implement frame 10 from the side plate 17 is a second vertical side plate 19 which extends forwardly and inwardly and terminates at a point rearwardly of the inner end of the first side plate 17. Preferably, the forward end of the side plate 19 is secured to the rear side of the side plate 17 at a position inwardly of the forward inner end of the side plate 17, as shown in FIG. 2. The lower ends of the side plates 17 and 19 are secured to forwardly and inwardly extending base members 21 and 22, respectively, which are equal in length to their associated side plates.

Figure 1:
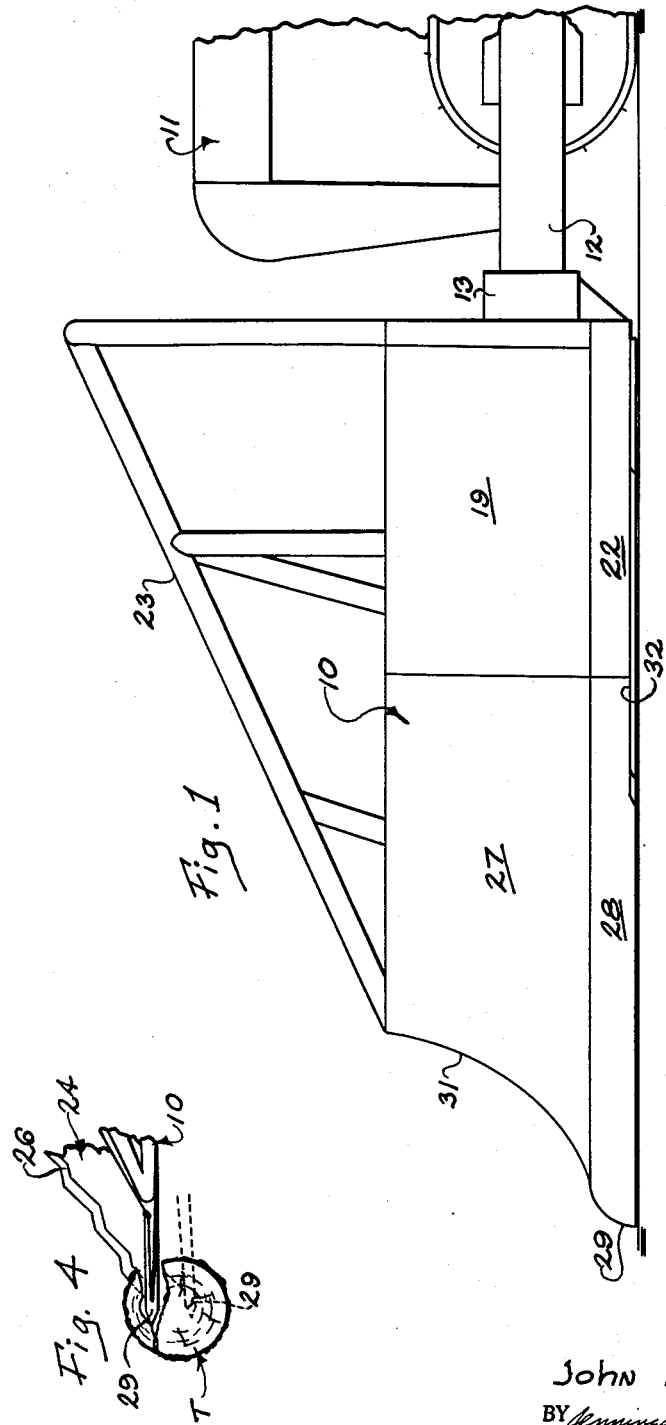
FIG. 1 is a side elevational view, partly broken away, showing the land clearing implement connected to a tractor.
Figure 3:
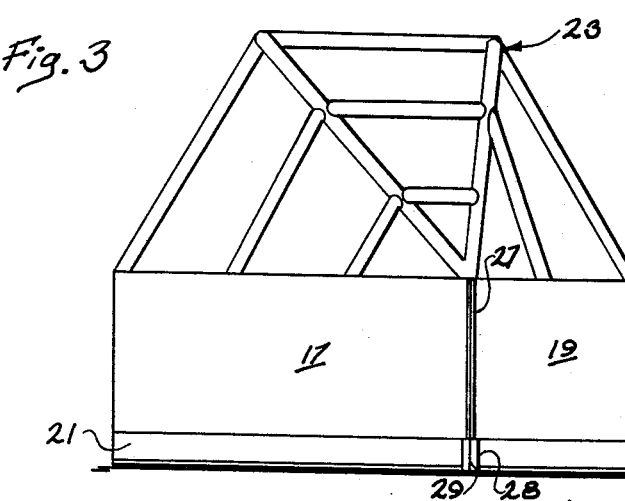
FIG. 3 is a front elevational view of the implement.

As shown in FIGS. 1, 2 and 3, the side plates 17 and 19 are connected to each other by a suitable superstructure indicated generally at 23 which prevents the falling vegetation from falling inwardly of the implement and deflects the vegetation away from the tractor 11 and the operator carried thereby. Since the superstructure 23 may assume various shapes and sizes, no further description thereof is deemed necessary.

Mounted adjacent the lower edge of the side plate 17 is a horizontal shear blade 24 which extends forwardly and inwardly across the longitudinal center line 18 of the implement frame, as shown in FIG. 2. The shear blade 24 is provided with a leading, working edge 26, as shown.

Secured to the forward side of the side plate 19 intermediate the ends thereof is a vertical plate 27 which extends generally parallel to the longitudinal center line 18 of the implement frame 10 and is secured to the forward inner end of the side plate 17. The lower edge of the vertical plate 27 is secured to a base member 28 which is substantially wider than the vertical plate 27, as shown. The forward end of the base member 28 forms a splitter element 29 having a sharp forward edge. The forward end of the vertical plate 27 slopes upwardly and rearwardly from the sharp edge of the splitter element 29 as at 31 to reinforce the splitter element and form an upper portion therefor.

Mounted adjacent the lower edge of the side plate 19 is an inwardly and forwardly extending horizontal shear blade 32 having a leading working edge 33, as shown. The shear blade 32 terminates at a point a substantial distance rearwardly of the splitter element 29, as clearly shown in FIGS. 1 and 2 whereby the shear blade 32 does not contact a tree trunk until after the splitter element 29 has penetrated the same and a forward portion of the shear blade 24 has cut the split portion off.

From the foregoing description, the operation of my improved land clearing implement will be readily understood. The implement is secured to the forward end of a power unit, such as a tractor 11, by the C-frame 12 whereby the implement is pushed forwardly of the tractor. When it is desired to sever a stump or tree adjacent the ground level, the splitter element 29 is moved inwardly of a side of the tree indicated at T, as shown in FIG. 4, whereby a side portion of the tree is split. Immediately upon splitting the side portion of the tree T, the shear blade 24 shears the split portion off. After the first portion is split and sheared off the tree T, the implement is again moved forwardly whereby the splitter element 29 assumes the dotted line position shown in FIG. 4 whereupon another portion of the tree trunk is split away and then immediately cut by the shear blade 24. It will thus be seen that by making successive passes at the tree trunk T, the entire trunk may be split away by the splitter element and sheared by the shear blade 24. Since the shear blade 32 terminates a substantial distance rearwardly of the splitter element 29, the shear blade 32 does not engage the tree trunk T during the splitting operation. However, after the tree trunk has been severed, the entire apparatus is moved forwardly whereby both shear blades 24 and 32 clear the entire area over which the implement 10 passes.

From the foregoing, it will be seen that I have devised an improved apparatus for clearing land. By providing a splitter element which is positioned laterally of a longitudinal plane passing through the implement, the splitter element is in clear view of the operator at all times. Also, by mounting a forwardly and inwardly extending shear blade adjacent one side of the splitter element and providing another shear blade at a substantial distance rearwardly of the splitter element, the portion of the tree split by the splitter element is immediately sheared whereby the entire tree trunk may be severed by successive passes at the tree. Furthermore, by providing forwardly and inwardly extending blades at both sides of the implement, with one shear blade extending forwardly of the other and terminating adjacent the splitting element, the entire area over which the implement passes is cleaned with one pass of the implement, thereby eliminating the necessity of having to first cut small growth and then rake the same prior to the removal of the larger growth.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. A land clearing implement comprising:
   (a) a movable frame,
   (b) a first shear blade mounted on said frame and extending forwardly and inwardly thereof in a generally horizontal plane from one side of said frame across the center line thereof,
   (c) a forwardly extending, generally vertical splitter element carried by said frame adjacent the inner end of said first shear blade, and
   (d) a second shear blade mounted at the opposite side of said frame from said first shear blade and extending forwardly and inwardly thereof in a generally horizontal plane with the inner end of said second shear blade terminating rearwardly of the inner end of said first shear blade in position for the splitter element and a forward portion of said first shear blade to split and shear off a portion of an object before said second shear blade contacts said object.

2. A land clearing implement as defined in claim 1 in which the forward edge of said splitter element extends upwardly and rearwardly.

3. A land clearing implement as defined in claim 1 in which the lower portion of said splitter element extends forwardly of the upper portion thereof and terminates in a relatively sharp forward edge.

4. A land clearing implement as defined in claim 3 in which the lower portion of said splitter element is wider than the upper portion thereof.

5. A land clearing implement comprising:
   (a) a movable frame,
   (b) a first shear blade mounted on said frame and extending forwardly and inwardly thereof in a generally horizontal plane from one side of said frame across the center line thereof,
   (c) a first upstanding side plate mounted on said frame adjacent the rear portion of said first shear blade and extending forwardly and inwardly from one side of said frame across the center line thereof,
   (d) a forwardly extending, generally vertical splitter element carried by said frame adjacent the inner end of said first shear blade,
   (e) a second shear blade mounted at the opposite side of said frame from said first shear blade and extending forwardly and inwardly thereof in a generally horizontal plane with the inner end of said second shear blade terminating rearwardly of the inner end of said first shear blade in position for the splitter element and a forward portion of said first shear blade to split and shear off a portion of an object before said second shear blade contacts said object, and
   (f) a second upstanding side plate mounted on said frame adjacent the rear portion of said second shear blade and extending forwardly and inwardly of said frame to a point rearwardly of said first side plate.

6. A land clearing implement as defined in claim 5 in which said second side plate is secured to the rear side of said first side plate in spaced relation to the forward end of said first side plate.

References Cited in the file of this patent

UNITED STATES PATENTS

| | | |
|---|---|---|
| 2,701,591 | Kissner et al. | Feb. 8, 1955 |
| 2,821,217 | Shald | Jan. 28, 1958 |

FOREIGN PATENTS

| | | |
|---|---|---|
| 531,138 | Great Britain | Dec. 30, 1940 |